United States Patent [19]

Akimoto et al.

[11] 4,364,084
[45] Dec. 14, 1982

[54] COLOR CORRECTION MONITORING SYSTEM

[75] Inventors: Taizo Akimoto, Minami-ashigara; Yasuo Kawase, Tokyo, both of Japan

[73] Assignee: Fuji Photo Film Co., Ltd., Kanagawa, Japan

[21] Appl. No.: 200,553

[22] Filed: Oct. 24, 1980

[30] Foreign Application Priority Data

Oct. 25, 1979 [JP] Japan .................................. 54-138113

[51] Int. Cl.$^3$ ................................................ G03F 3/08
[52] U.S. Cl. ......................................... 358/76; 358/54
[58] Field of Search ..................... 358/54, 76; 250/559, 250/214 P, 571, 209; 356/404; 355/68, 69, 83, 97

[56] References Cited

U.S. PATENT DOCUMENTS

| | | | |
|---|---|---|---|
| 2,757,571 | 8/1956 | Lougaren | 358/76 |
| 3,972,066 | 7/1976 | Seki | 358/76 |
| 4,097,892 | 6/1978 | Balding | 358/76 |
| 4,250,522 | 2/1981 | Seki | 358/76 |
| 4,299,479 | 11/1981 | Harvey | 355/68 |

*Primary Examiner*—Michael A. Masinick
*Attorney, Agent, or Firm*—Gerald J. Ferguson, Jr.; Joseph J. Baker; C. Lamont Whitham

[57] ABSTRACT

In a color printer system, a color film is checked and necessary color correction information is input into a recording medium before the color prints are made from the color film. The color film is first automatically analyzed and automatically corrected. The conditions of correction automatically obtained by the automatic color film analyzer are used for correcting color images. The color images with the automatically obtained correction conditions are displayed on a color video monitor. A human monitor observes the displayed images and determines whether or not additional corrections are necessary. Further, the monitor determines whether or not the images should be printed due to extremely bad exposure conditions like badly blurred images. The monitor inputs additional correction information and other necessary information to the analyzer. The images are then further corrected according to the additional correction information and again displayed. The printing process is performed after final check and correction by the human monitor.

2 Claims, 7 Drawing Figures

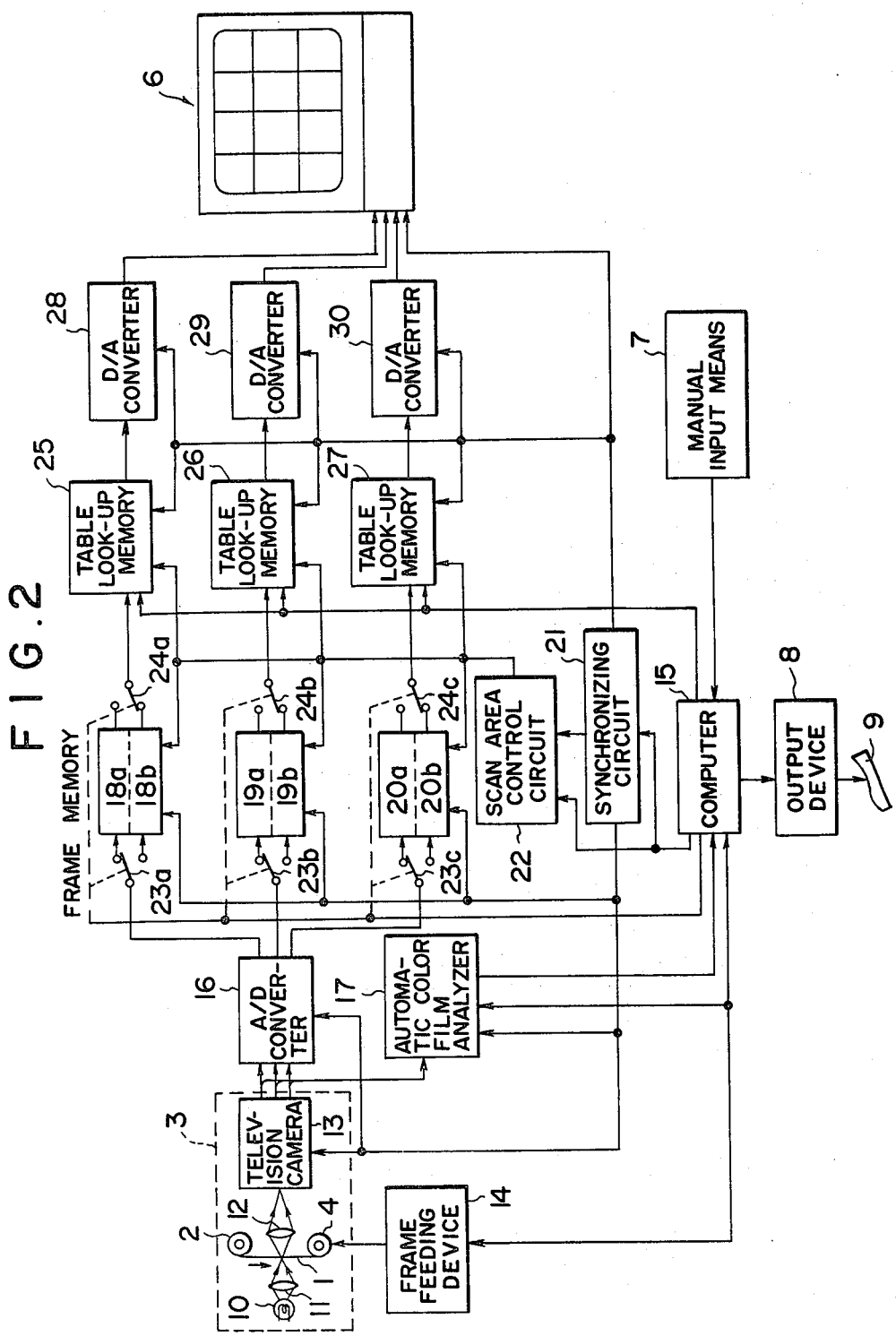

COLOR CORRECTION MONITORING SYSTEM

BACKGROUND OF THE INVENTION

1. Field of the Invention

This invention relates to a color correction monitoring system for a color printer, and more particularly to an apparatus for monitoring color corrected images displayed on a CRT before the images are printed on a photographic paper.

2. Description of the Prior Art

In a coloring printing laboratory, color photographic prints are made from color originals by a process as follows. A number of developed color films both of positive and negative are spliced into an elongated color film web. The color film web is checked by a skilled monitor to determine the conditions of correction in color and density. The conditions of correction have recently be automatically determined by use of an automatic color film analyzing device.

The information for the correction determined by the monitor or by the automatic analyzing device is recorded on a recording medium such as a paper tape or magnetic tape. The recording medium carrying the correction information and the elongated color film web are put into an automatic printer so the color images are printed on a photographic paper in a desired color and density by controlling the printer based on the correction information read out from the recording medium.

The printed color photographs are inspected as to their color density. The prints determined to be improper are thrown away and reprinted with different printing conditions. Finally, the printed photos are grouped for customers and separately packed in envelopes.

The above-mentioned monitoring or checking process needs a high skill and, accordingly, the error in this process depends upon the skill of the monitors. Therefore, the yield of the color printing process depends highly upon the skill of the operators or monitors of the printing process. When the automatic color film analyzer is used for checking the color negative or film, the skilled monitors are not needed. On the other hand, however, the automatic color film analyzer is disadvantageous in finding out some kinds of failures in color and/or density such as color failure, back-light and light source color which are easy for a human monitor to find.

The mistake in monitoring will result in failure in printing and accordingly require the reprinting process, which is economically undesirable due to loss of paper, developer and labor. The cost up in the printing process will result in cost up in the printed photos.

SUMMARY OF THE INVENTION

The primary object of the present invention, therefore, is to provide a color correction monitoring system which is capable of monitoring the color corrected image which is once corrected according to the determined correcting conditions, whereby the corrected image can be monitored before printed.

Another object of the present invention is, therefore, to provide a color correction monitoring system which makes it possible to disuse a skilled man monitor or a sophisticated automatic color film analyzing device.

The color correction monitoring system in accordance with the present invention comprises a video monitor which displays a color image equivalent to the color image to be printed after subjected to color correction. In other words, the color image to be printed after color correction can be monitored by a color video monitoring device. Accordingly, when the corrected image is still unsatisfactory, the correcting conditions can be readjusted to provide satisfactory color image. Thus, the useless color printing can be prevented and the waste in printing can be precluded.

Furthermore, the color monitoring system in accordance with the present invention is provided with an automatic color film analyzing device for automatically determining the conditions of correction based on LATD by use of the maximum density and the minimum density. First, the color correction is automatically made by the automatic color film analyzer and the automatically corrected color image is displayed by the video monitor. Then, a human monitor observes the displayed color image and judges the corrected image and determines whether or not a further correction is necessary. If, for instance, the human monitor finds a color failure, back light and/or light source color which cannot easily be found out by the automatic color film analyzer, he manually operates a color correcting means to further correct the color when necessary. Thus, even without a highly accurate and sophisticated automatic color film analyzer a color print of high quality can be obtained. Further, as compared with a system in which the correction is conducted all by manual operation, the processing speed is markedly improved.

Further, the color correction monitoring system in accordance with the present invention is characterized in that a plurality of color images in the successive frames are displayed at once by a color video monitor. In general, photos of the same object or similar objects are taken successively in adjacent frames of a film. These photos should preferably be printed into the same or similar color balance and density. By displaying the plurality of images of the successive frames at once on a CRT of the color video monitor, it is possible to check the conditions of the corrected color of the successive images.

Moreover, in case of a particularly aged film, even a highly skilled human monitor cannot properly correct the color by one correction. Therefore, it is necessary to test the color correction once and see the result of the correction and reprint the image. By use of the system of this invention, the tested correction, namely the once corrected color image, can be observed before printed by the monitor, and accordingly the reprint is unnecessary.

BRIEF DESCRIPTION OF THE DRAWING

FIG. 2 is a block diagram of the color correction monitoring system in accordance with an embodiment of the present invention.

DESCRIPTION OF THE PREFERRED EMBODIMENTS

Now the present invention will be described in detail with reference to the accompanying drawings.

Figure 1:
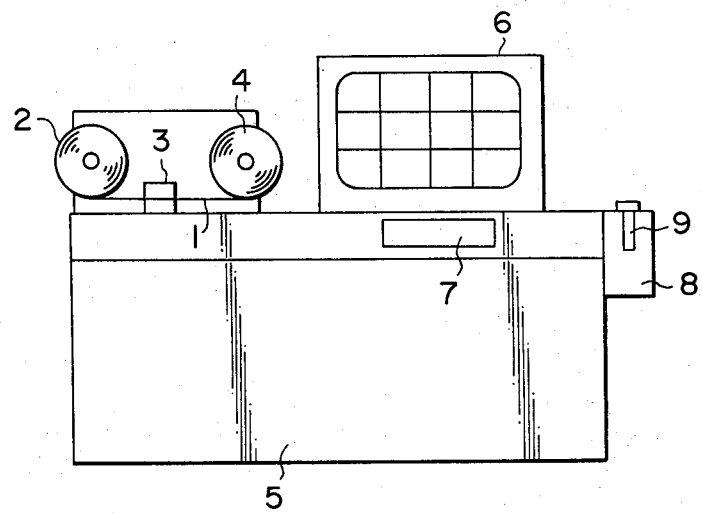
FIG. 1 is a front view of the color correction monitoring system in accordance with an embodiment of the present invention.

Referring to FIG. 1, a developed color negative film web 1 is wound up on a supply reel 2 and fed out thereof into a scanning station 3. Passing through the scanning station 3, the film web 1 is taken up on a take-up reel 4. At the scanning station 3, the image on the film is scanned by an image scanning means to get an electric image signal of the color image recorded on the film.

The reels 2 and 4 are mounted on a body 5 of the monitoring system which is provided therein with a later-mentioned circuitry and processes the color image signal read out at the scanning station 3. The color image signal or the video signal of the color negative film web 1 is sent to a color video monitor 6 mounted on the body 5. The color video monitor 6 displays a plurality of images having the same color and density as those of the color images which will be printed. For example, 12 frames of images are displayed at once.

A human monitor observes the displayed images on the color video monitor 6 and determines whether or not a further correction is necessary. With a continuing improper image, the human monitor manually operates the input device 7 and inputs the further necessary correction factor. After the manual correction made in addition to the displayed automatic correction, the corrected image is again displayed on the monitor 6. Further, for the improper image that cannot be printed such as a badly blurred image or a blank frame, the human monitor inputs non-print information at the input device 7 so that the frame will not be printed. The finally corrected conditions and the automatically corrected conditions made for every images are all recorded on a recording medium 9 such as a magnetic tape or a paper tape outputed by an output device 8 attached to the body 5.

FIG. 2 is a block diagram showing the structure of the color correction monitoring system in accordance with an embodiment of the present invention. The film scanning station 3 includes a light source 10, lenses 11 and 12 and a color television camera 13 and scans each frame of the color negative film web 1 to obtain color video signals of three colors of red, green and blue. As for the film scanning station 3, not only the above-mentioned scanning system but also various other types of scanning systems can be employed. For instance, a combination of a flying spot scanner and a dichroic filter for separating color into three colors, a combination of a linear light source and a film feeding means combined with a combination of a dichroic filter and a line sensor, and a combination of a rotating disc having a small hole and a light source combined with a combination of a dichroic filter and a photo-multiplier can be used.

A frame feeding device 14 sets each frame of the film 1 at a predetermined position according to the order given by a computer 15. An A/D converter 16 converts color video signals of 6 to 8 bits of red, green and blue sent from the color television camera 13 into digital color video signals.

An automatic color film analyzer 17 is connected with the television camera 13 to record the color video signals therefrom in a memory therein and then read out the memorized signals and computes by analog or digital operation various values such as LATD (large area transmittance density), color phase of LATD ($LATD_R$, $LATD_G$, $LATD_B$), upper LATD, lower LATD, maximum value, minimum value, number of points of flesh color, number of points of red color, number of points of green color, number of points of blue color, number of points of yellow color, average value of the flesh color. Then, by use of the computed values, the analyzer 17 classifies the images or pictures into various groups such as ones having color failure, ones taken under tungsten light, ones taken under fluorescent lamp, ones taken under sunset, ones under sunrise, aged ones and normal ones, and computes the conditions of correction according to the classification. The automatic color film analyzer having such a function is disclosed in detail in copending Japanese Patent Applications Ser. Nos. 53(1978)-99906, 99907, 99908, 99909, 99910, 99911, 99912 and 103571.

Frame memories are connected with the output of the A/D converter 16 to memorize the data for one frame of the display by the color video monitor 6. The frame memories are composed of red frame memories 18a, 18b, green frame memories 19a, 19b and blue frame memories 20a, 20b. The reason for providing two memories for each color is to conduct both scanning and displaying in parallel at a time.

The frame memories memorize color video signals of a plurality of frames in the predetermined memory areas by the synchronizing signal from a synchronizing circuit 21 and the area control signal from a scan area control circuit 22.

Switches 23a, 23b, 23c are connected between the A/D converter 16 and the frame memories 18a, 18b to 20a, 20b respectively for appointing the frame memories into which the data are to be recorded. Switches 24a, 24b, 24c are connected with the output of the frame memories 18a, 18b to 20a, 20b for appointing the frame memories from which the data is to be read out. With these switches, the digital video signals are recorded in one of the pairs of the frame memories 18a, 19a, 20a and the digital video signals are read out from the other if the pairs of the frame memories 18b, 19b, 20b.

Table look-up memories 25, 26, 27 are connected with the switches 24a, 24b, 24c for converting the gradation (gamma: γ) of the color video signal based on a table look-up system. Thus, the color video signals read out from the frame memories 18a, 18b, 19a, 19b, 20a, 20b are gradation-converted. The look-up memories 25, 26, 27 are one 25 for red, another 26 for green and the other 27 for blue.

The gradation resulted from the whole system $\Gamma_T$ is represented by the following formula:

$$\Gamma_T = \Gamma_F \times \Gamma_P \times \Gamma_{CRT} \times \Gamma_L \ldots \quad (1)$$

where $\Gamma_F$ is the gamma of the film, $\Gamma_P$ is the gamma of the photo-electric conversion system, $\Gamma_{CRT}$ is the gamma of the CRT and $\Gamma_L$ is the gamma of the table look-up memory. If the following conditions are put into the formula (1), $\Gamma_F = -0.6$
$\Gamma_p = 1.0$
$\Gamma_{CRT} = 2.2$, and the gamma of the whole system is assumed idealistically to be $\Gamma_T = 1.0$, the gamma of the table look-up memory $\Gamma_L$ becomes as $$\Gamma_L = \Gamma_T \div (\Gamma_F \times \Gamma_P \times \Gamma_{CRT})$$
$$= 1.0 \div (-0.6 \times 1.0 \times 2.2) \approx -0.76.$$

Figure 3:
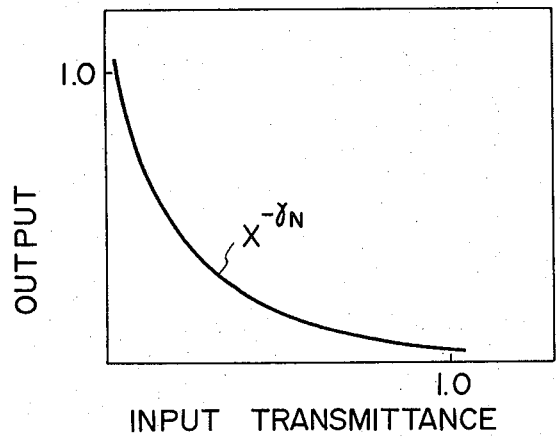
FIG. 3 is a graph showing the table values of the standard gamma ($\gamma$) conversion.

With the value −0.76 as the standard gamma (γ), i.e. −γ$_N$, the conversion table values can be represented on a brightness scale as shown in FIG. 3.

The standard gamma conversion table values shown in FIG. 3 show the conversion rate when the negative is converted to positive. These values are memorized in the memory of the computer 15. Since, the gamma of the film (Γ$_F$) is different for the negatives from that for the positives, the standard gamma conversion tables should be separated prepared for the negatives and positives and stored in the computer so that the tables may be selectively used according to the kind of the film. The standard gamma conversion tables are corrected according to the correction conditions computed by the automatic color film analyzer 17.

When the average transmittance of an image is T and the amount of correction is α, the average transmittance T is printed into a constant density on a print in a photographic printing system. When this is applied to the system of this invention, the gain of the system (A) is controlled to provide a constant input transmittance T$_0$. That is, the following formula is processed;

$$T_0 = A \cdot \alpha T, \text{ and}$$

accordingly, $$A = (T_0/\alpha T). \quad (2)$$

When the input value at a measuring point is x′ and the value at the table is x, the following formula is obtained.

$$x'^{-\gamma N} = (Ax)^{-\gamma N} \quad (3)$$
$$= \left(\frac{\alpha T}{T_0}\right)^{\gamma N} \cdot x^{-\gamma N}$$
$$= G \cdot x^{-\gamma N}$$

Therefore, the gain G obtained for the correcting amount α can be multiplied to the standard gamma conversion table value.

Then, the computer 15 conducts the operation of the formula (3) for every color of the image in each frame and sends the gamma conversion table values for the respective colors obtained to the respective table look-up memories 25,26,27 to rewrite the table values. In practice, the table look-up memories 25,26,27 are high speed RAM groups provided for every frame. By the area control signal, one of the groups which memorizes the gamma table values for the frame is selected.

The color video signals table-converted at a high speed by the table look-up memories 25,26,27 have the same density and color as those of the image which will be printed. The color video signal is inputed into D/A converters 28,29,30 to be converted to analog signals. The analog color video signals thus obtained are sent to the color video monitor 6. The color video monitor 6 displays twelve positive images of the successive frames of image at once on one frame of CRT.

Figure 4:
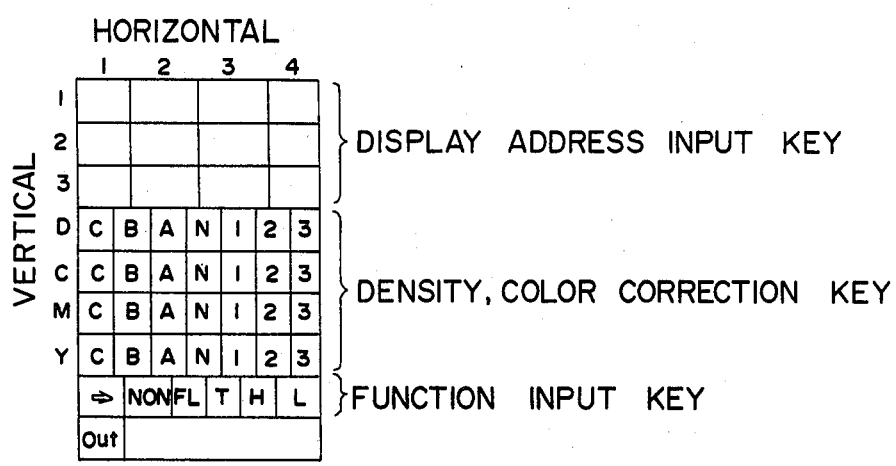
FIG. 4 is a plan view showing the input key of the manual operation input device.

The manual input device 7 is provided, as shown in FIG. 4, with display address input keys for appointing the frame position, density and color correction keys for manually correcting the printing conditions of the appointed frame, and function input keys. Among the function input keys, the leftmost key having a mark of an arrow is a key for inputing that the correction is the same as that for the previous frame. The next key having a mark of "non" is a key for inputing that printing of the frame is unnecessary because of a failure of photographing such as the case of badly blurred image. The key of "FL" is for inputing that the photo is taken under fluorescent lamp, and the key of "T" is for inputing that the photo is taken under tungsten lamp. Further, the key of "H" is for inputing a high correction mode, and the key of "L" is for inputing a low correction mode. The key of "OUT" is for outputting the manually selected printing information or automatically computed printing information obtained by the automatic color film analyzer 17 to the recording medium 9.

The computer 15 controls the sequence of the whole system as well as computes the corrected gamma conversion table values and forwards the values to the table look-up memories 28,29,30 at a high speed. Further, the computer 15 memorizes the computed conditions of correction obtained by the automatic color film analyzer 17 or the conditions of correction inputed by the manual input device 7, and forwards the memorized conditions to the output device 8.

The scan area control circuit 22 operates to display a plurality of frames on a color video monitor 6 by appointing the memory areas of the frame memories and the table look-up memories by the synchronizing signals from the synchronizing circuit 21.

Now the operation of the above-described system will be described in detail.

The computer 15 changes over the switches 23a,23b,23c and 24a,24b,24c to select one of the pairs of the frame memories. In FIG. 2 for instance, the frame memory 18a is in the recording mode and the other frame memory 18b is in the read-out mode. In response to output of a frame feed command from the computer 15, the frame feeding device 14 feeds the elongated color film web 1 by one frame to set the next frame at the scanning station 3. Upon completion of the frame feed, the computer 15 increments a frame counter and forwards the incremented count to the scan area control circuit 22. The scan area control circuit 22 gives a signal to the frame memories to appoint the area into which the information should be recorded.

In response to output of the scan starting command from the computer 15, the film scanning station 3 starts scanning of the image and generates three color video signals of red, green and blue. The color video signals generated from the scanning station 3 are sent to the automatic color film analyzer 17 and the A/D converter 16. The automatic color film analyzer 17 starts sampling according to the sampling clock signals from the synchronizing circuit 21 and records the video signal at the predetermined measuring points in the memories. The A/D converter 16 converts the color video signal to a digital signal according to the sampling clock signal. The automatic color film analyzer 17 computes various values from data for one frame of image such as LATD, the maximum value, minimum value, the number of points of flesh color, and obtains the conditions of correction with respect to the LATD. The conditions of correction thus obtained are sent to the computer 15 and memorized therein. After the computation of the correction conditions is finished, the analyzer 17 sends an end signal to the computer 15. The computer 15 outputs a frame feed command upon receipt of the end signal. Thus, one frame of the film web 1 is fed.

When the scanning of 12 frames is finished, the computer 15 outputs a frame memory change-over command and the other buffers or frame memories 18b are selected. Simultaneously, the frame counter is cleared and the next 12 frames are scanned and the data are recorded in the same way as that of the former 12 frames.

Now, the operation of the read-out mode will be described in detail. In the above-mentioned embodiment, two buffers or frame memories are employed, and accordingly the recording mode and the read-out mode are conducted in parallel. The computer 15 obtains a gain G according to the correction conditions computed by the automatic color film analyzer 17, and obtains a gamma conversion table value by multiplying the gain G by the standard gamma conversion table value $(x^{-\gamma N})$. The gamma conversion table value thus obtained is recorded in the table look-up memories at the areas corresponding to the twelve frames in the blanking period of the color video monitor 6.

The color video signal for the 12 frames recorded in the frame memories is sequentially read out and sent to the table look-up memories 25,26,27. The table look-up memories conduct gamma conversions by the table values corresponding to the frames at the corresponding areas selected according to the area control signal.

By this gamma conversion, a color video signal of a positive image having a corrected density and color can be obtained. The color video signal thus obtained after gamma conversion in the high speed table look-up system is sent to the D/A converters 28,29,30 and converted to an analog signal for every color. The analog color video signals thus obtained are sent to the color video monitor 6 and color images of the 12 frames are displayed on the CRT. It is preferable to display the corrected keys such as density keys and color keys together with the displayed images for indicating the correction conditions for the displayed images.

The human monitor observes the displayed images and determines whether or not the color correction made in the displayed images is proper and sufficient. Further, he determines which images which should not be (printed such as badly blurred images). For an improper color correction, he can make additional correction by inputing correction conditions by the density and color correction keys after appointing the frames with the display address input key. For the blurred image, he depresses the function key of "NON" which inputs information of no-print.

These additional correction information signals are inputed into the computer 15, and the gamma conversion table values in the table look-up memories are re-written according to the additional correction. Then, the color video signal is gamma-converted by the new table values and the corrected images are displayed again on the color video monitor 6.

By depressing the functon key of "OUT" at the time the additional correction and check for all the displayed frames have been completed, the finally determined conditions of correction are recorded in the recording medium 9 and the color images having the finally corrected conditions are displayed on the color video monitor 6.

Figure 5:
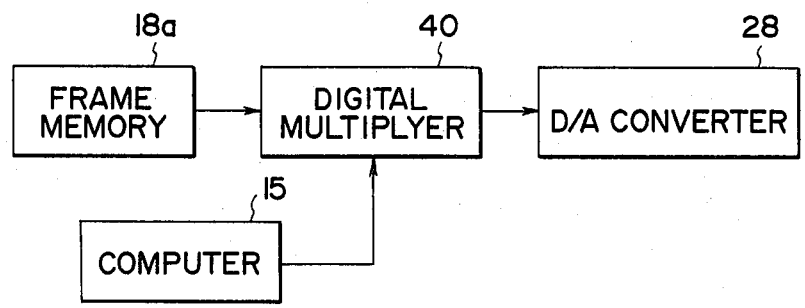
FIG. 5 is a block diagram showing an example of a part of the system employing a high speed digital multiplier.

In the above described embodiment, the multiplication of the formula (3) is conducted by the computer 15 and the result of the multiplication is recorded in the table look-up memories. However, it is possible to provide a high speed digital multiplier 40 and the gain is set by the multiplier 40 as shown in FIG. 5. The digital multiplier 40 is connected between the frame memory 18a and the D/A converter 28 and is controlled by the computer 15. In this method, the standard gamma conversion table value is recorded in the table look-up memories and the table look-up memories conduct standard gamma conversion. On the other hand, in the digital multiplier 40, the density and color correction are made.

Figure 6:
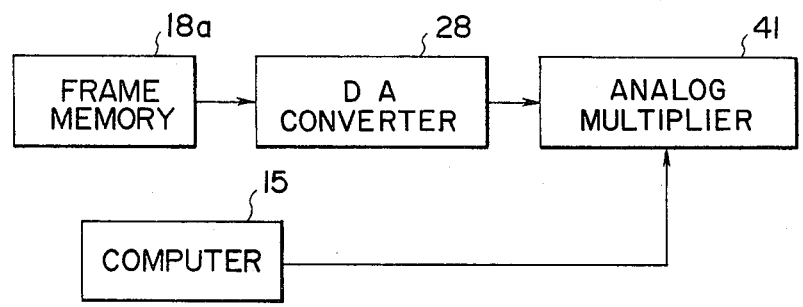
FIG. 6 is a block diagram showing an example of a part of the system employing a high speed analog multiplier.
Figure 7:
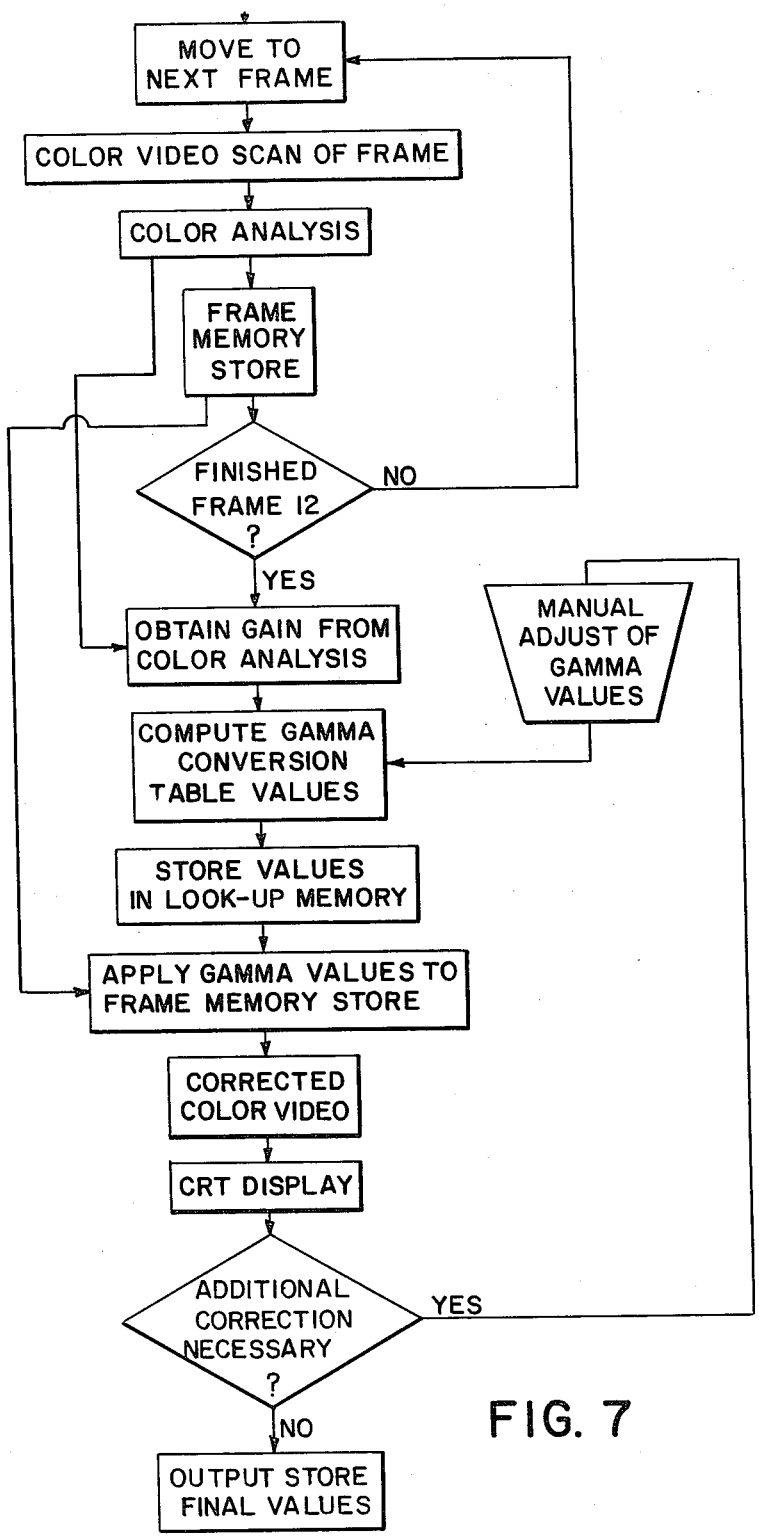
FIG. 7 is a flow chart outlining the system operation.

FIG. 6 shows another embodiment in which a high speed analog multiplier 41 is connected with the output of the D/A converter 28. In this embodiment, the multiplication is conducted by the analog multiplier 41.

I claim:

1. A color film monitoring system for a color printing system comprising in combination:
   a film scanning means for scanning the color images on a film and generating three color video signals of red, green and blue,
   an A/D conversion means for converting the color video signal to a digital color video signal,
   frame memory means for recording the digital color video signals of a plurality of frames of image,
   table look-up memory means for image processing the digital color video signal read out from the frame memory means,
   a D/A conversion means for converting the image processed digital color video signal into an analog color video signal,
   a color video monitor means receiving said analog color video signal and displaying a plurality of frames of image on a cathode ray tube,
   an automatic color film analyzer means for obtaining LATD, maximum value and minimum value based on the color video signal from said film scanning means and computing the conditions of correction of color and density using said values,
   a computer means for controlling the sequence of operation of the whole system, correcting standard gradation conversion table values according to the conditions of correction from said automatic color film analyzer, and recording the corrected gradation conversion table values in table look-up memories,
   a manually operable input means for correcting the gradation conversion table values recorded in said table look-up memories by inputing address of a frame and the amount of correction for the frame of image displayed on said color video monitor, and
   a recording means for recording the automatically obtained conditions of correction and/or the conditions of correction which are manually inputed.

2. A color film monitoring system for a color printing system comprising in combination:
   a film scanning means for scanning the color images on a film and generating three color video signals of red, green and blue,
   an A/D conversion means for converting the color video signal to a digital color video signal,
   frame memory means for recording the digital color video signal of a plurality of frames of image,
   table look-up memory means for conducting standard gradation conversion on the digital color video signal read out from the frame memory means, a D/A conversion means for converting the gradation converted digital color video signal into an analog color video signal, a color video monitor means receiving said analog color video signal and displaying a plurality of frames of image on a cathode ray tube, an automatic color film analyzer means for obtaining LATD, maximum value and minimum value based on the color video signal from said film scanning means and computing the conditions of correction of color and density using said values, a computer means for controlling the sequence of operation of the whole system, and computing a gain according to the conditions of correction from said automatic color film analyzer, a multiplying means connected with the output of said look-up memory means or said D/A conversion means for multiplying the output therefrom by said gain, a manually operable input means for correcting the gradation conversion table values recorded in said table look-up memories by inputing address of a frame and the amount of correction for the frame of image displayed on said color video monitor, and a recording means for recording the automatically obtained conditions of correction and/or the conditions of correction which are manually inputed.

* * * * *